United States Patent
Subramanian et al.

(10) Patent No.: US 7,610,177 B2
(45) Date of Patent: Oct. 27, 2009

(54) MANUFACTURING EXECUTION SYSTEM, EQUIPMENT INTERFACE AND METHOD OF OPERATING A MANUFACTURING EXECUTION SYSTEM

(75) Inventors: Jayaraman Subramanian, Singapore (SG); Akhauri Prakash Kumar, Bietigheim-Bissingen Baden Wuertemberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 343 days.

(21) Appl. No.: 11/588,833

(22) Filed: Oct. 27, 2006

(65) Prior Publication Data

US 2008/0103617 A1    May 1, 2008

(51) Int. Cl.
*G06F 19/00* (2006.01)
(52) U.S. Cl. .......................................... 702/188; 700/96
(58) Field of Classification Search ................. 702/182, 702/188; 700/51, 96, 108, 121
See application file for complete search history.

(56) References Cited

U.S. PATENT DOCUMENTS

| | | | |
|---|---|---|---|
| 6,615,090 B1 * | 9/2003 | Blevins et al. | 700/26 |
| 6,772,034 B1 | 8/2004 | Shi et al. | 700/121 |
| 6,839,713 B1 | 1/2005 | Shi et al. | 707/101 |
| 6,970,758 B1 * | 11/2005 | Shi et al. | 700/108 |
| 7,069,101 B1 | 6/2006 | Arackaparambil et al. | 700/121 |

* cited by examiner

*Primary Examiner*—Bryan Bui

(57) ABSTRACT

A manufacturing execution system for manufacturing a product is provided. The manufacturing execution system includes a manufacturing execution plan having a set of manufacturing steps to be executed for manufacturing the product, a planning component for determining a data collection plan of data to be collected during the execution of one of the manufacturing steps, a service interface for providing the data collection plan in response to a service request, and a database for storing data that has been collected in accordance with the determined data collection plan.

16 Claims, 3 Drawing Sheets

MANUFACTURING EXECUTION SYSTEM, EQUIPMENT INTERFACE AND METHOD OF OPERATING A MANUFACTURING EXECUTION SYSTEM

FIELD OF THE INVENTION

The present invention relates generally to plant automation. In particular, the invention relates to manufacturing execution systems.

BACKGROUND

Manufacturing execution systems (MES) are as such known from the prior art. MES are also referred to as computer integrated manufacturing (CIM) systems.

U.S. Pat. No. 6,970,758 shows a method for collecting data from process and metrology tools in a semiconductor manufacturing environment, for generating statistics from that data, detecting tool failures, processing errors, and performing high level process control in the form of tool shutdowns, lot holds, and lot releases. The collection and recording of data from process and metrology tools, the configuration of data collection, and automation of process equipment shutdowns is performed within the framework of an existing MES and engineering data collection system. Automation of configurations and data collection is conducted by creation of data collection plans, data collection capability specifications, and other versioned documents within a process control and data collection system. These versioned documents may be generated through a common graphical user interface and presented via an Internet web browser or other network interface. U.S. Pat. Nos. 6,772,034; 6,839,713 and 7,069,101 show similar methods and systems.

SUMMARY OF THE INVENTION

In accordance with the present invention there is provided a manufacturing execution system comprising a manufacturing execution plan being indicative of a set of manufacturing steps to be executed for manufacturing a product, a planning component for determining a context-specific data collection plan for data to be collected during execution of at least one of the manufacturing steps, a service interface for providing the data collection plan in response to a service request, and a database for storing data that has been collected in accordance with a context-specific data collection plan.

In accordance with an embodiment of the invention each context-specific data collection plan is specified by a set of one or more data collection parameters. The set of data collection parameters may include parameters for defining limits of the data collection, such as limits given by a product specification or validation limits, parameters for defining the sampling to be executed, such as how much data to collect and the measurement components to be used for the sampling, parameters for defining rules, such as rules for exception handling, if an out of specification condition or missing data condition occurs, and/or parameters for defining the frequency of the data collection.

In accordance with an embodiment of the invention the parameters for defining limits, the parameters for defining the sampling, the parameters for defining rules and/or the parameters for defining the frequency of the data collection are given as respective separate objects. Each context-specific data collection plan is thus specified by a set of such objects assigned to the context-specific data collection plan.

This has the advantages of flexibility and reusability as each of the objects can be reused multiple times for specifying various context-specific data collection plans. Further, this facilitates the modification of a default context-specific data collection plan as the modification can be performed by replacing an object contained in the specification of the default context-specific data collection plan by another predefined object or by modifying just that object.

Further, the object-based specification of the default or modified context-specific data collection plans facilitates dynamic adaptation of the sampling performed for the data collection. Under normal conditions the default objects assigned to the default context-specific data collection plan are used, including the default object that specifies the sampling. If a certain conditions is fulfilled, the default object is replaced by another object that specifies other sampling parameters. This other object is used as long the condition persists. When the condition is no longer fulfilled, the other object is replaced by the default object in order to go back to the default context-specific data collection plan.

Embodiments of the present invention may facilitate the provision of context-specific data collection plans through a service interface, such as a web service interface or another interface that provides methods or functions to be called. In particular, the service interface may support a request—response protocol, such as the hypertext transfer protocol (HTTP).

Embodiments of the present invention are particularly advantageous as the data collection plan is determined depending on the context of a given manufacturing step in a manufacturing execution plan. For example, the manufacturing steps preceding and/or following a given manufacturing step in accordance with the manufacturing execution plan determine the context of that manufacturing step. This context is used for determining the respective data collection plan.

In accordance with an embodiment of the invention the context-specific data collection plan is a predefined default data collection plan. For example, default data collection plans that are related to respective manufacturing steps are stored in a database, such as a relational database.

In accordance with an embodiment of the invention the manufacturing execution system has an analytical component for analytical processing of the data that has been collected in accordance with one or more of the data collection plans. The analysis of that data provides a result that can be used as a basis for determining a modified context-specific data collection plan.

In accordance with an embodiment of the invention the modified context-specific data collection plan is provided in response to a subsequent service request relating to the same context.

In accordance with an embodiment of the invention a predefined criterion and a related action are stored in the manufacturing execution system. The action is triggered, if the predefined criterion is not met by the data that has been collected in accordance with the data collection plan. The action may be a maintenance action for performing or preparing maintenance of one of the manufacturing tools.

In accordance with an embodiment of the invention the service interface is adapted to send a maintenance request to a maintenance workflow manager. For example, if a predefined criterion is not fulfilled by the data that has been collected in accordance with the data collection plan, this may indicate that the respective manufacturing tool requires maintenance. As a consequence the maintenance request is generated and sent to the maintenance workflow manager via the service interface.

In accordance with an embodiment of the invention the service interface of the manufacturing execution system is coupled to a communication network, such as a message network. For example, messages are interchanged via the message network using XML documents. A number of service consumers of the services provided by the manufacturing execution system and/or service providers may be coupled to the message network. This may constitute a service oriented architecture (SOA). The communication network may or may not have real-time or near real-time capabilities.

In another aspect the present invention relates to an equipment interface comprising a first interface for coupling to a plurality of manufacturing tools via a communication network, such as a fieldbus, and a second interface for sending a request for a data collection plan of one of the manufacturing tools to a manufacturing execution system and for receiving a response from the manufacturing execution system carrying the data collection plan, the second interface being operable to forward the data collection plan to the one of the manufacturing tools via the communication network.

In accordance with an embodiment of the invention the communication network that couples the manufacturing tools has real-time capabilities as a precise timing of the communication between the manufacturing tools may be critical for the manufacturing process.

In still another aspect the present invention provides a method of operating a manufacturing execution system, the manufacturing execution system comprising a manufacturing execution plan being indicative of a set of manufacturing steps to be executed by manufacturing tools for manufacturing a product, the method comprising receiving a request for a data collection plan from one of the manufacturing tools, determining the data collection plan of data to be collected during execution of one of the manufacturing steps depending on the context of the one of the manufacturing steps, and sending a response comprising the data collection plan to the one of the manufacturing tools.

In still another aspect the present invention provides a computer program product for performing such a method.

It is to be noted that the present invention is broadly applicable to many kinds of manufacturing, such as manufacturing of semiconductor products, automotive products, pharmaceutical products, solar cells, electronic devices, hard discs, consumer electronics products, and integrated electronic circuits.

BRIEF DESCRIPTION OF THE DRAWINGS

In the following preferred embodiments of the invention will be described in greater detail by way of example only making reference to the drawings in which.

DETAILED DESCRIPTION

Figure 1:
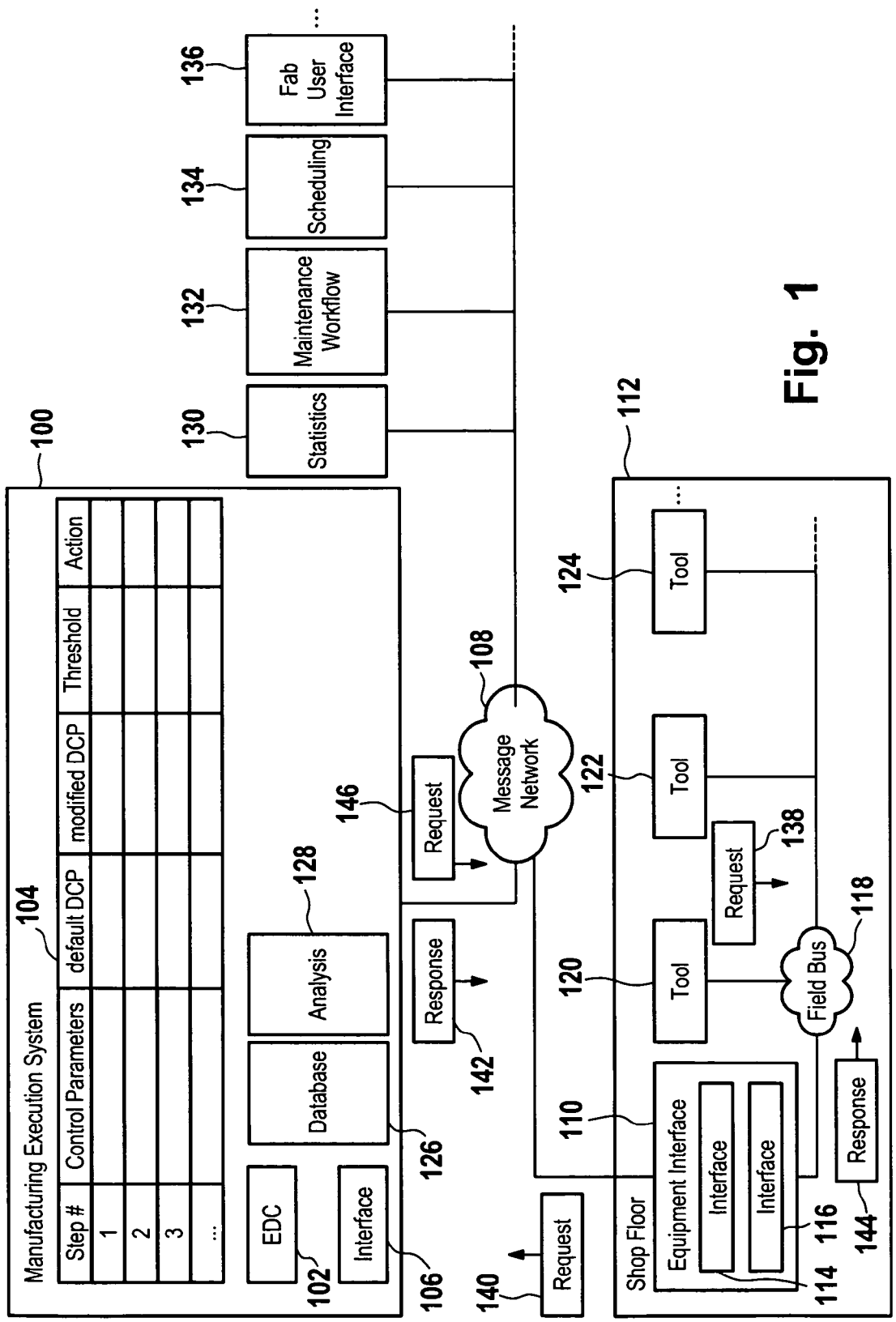
FIG. 1 is a block diagram of an embodiment of a manufacturing execution system and an equipment interface.

In the following detailed description like elements are designated by like reference numerals.

FIG. 1 shows a manufacturing execution system (MES) 100 that includes an engineering data collection (EDC) system 102. The MES 100 comprises a manufacturing execution plan 104 that specifies manufacturing steps 1, 2, 3, ... to be executed for manufacturing a certain product. Each of the manufacturing steps may be specified by one or more control parameters or otherwise.

For each manufacturing step data needs to be collected in accordance with a respective data collection plan (DCP). The data collection plans are context-specific. In other words, the data to be collected depends not only on the nature of a given step, but also on one or more preceding or following manufacturing steps.

For example, both steps 4 and 94 are ion implantation steps for manufacturing a semiconductor device. Even though steps 4 and 94 are of the same step type, i.e., ion implantation, they have different contexts as their preceding and/or succeeding steps are different. Due to the different contexts of these steps the respective data collection plans may also differ.

The MES 100 has an interface 106 for coupling the MES 100 to a communication network, such as a message network 108. An equipment interface (EI) 110 of a shop floor 112 is also coupled to the message network 108. The EI 110 has a respective external interface 114 for coupling to the message network 108 and an internal interface 116 for coupling the equipment interface to a communication network, such as fieldbus 118 of the shop floor 112 or a communication network that provides a high speed messaging service, such as a Semiconductor Equipment and Materials International (SEMI) Equipment Automation Software Standard, e.g. E5-0701 and/or E37-0298. A number of manufacturing tools 120, 122, 124, ... is coupled to the fieldbus 118 and thus to the equipment interface 110.

The MES 100 has a database 126 for storing data that has been collected by the tools 120, 122, 124, ... in accordance with the respective data collection plans that have been provided from the MES 100 to the equipment interface 110. The MES 100 further comprises an analytical processing system 128 for analysis of the data that is stored in the database 126.

The analysis performed by the analytical processing component 128 can be performed in order to determine whether the data stored in the database 126 indicates that the manufacturing process executed on the shop floor 112 is within the manufacturing specification, out of the manufacturing specification and/or whether the process has the tendency to go out of specification or not. Depending on a result of the analysis one or more of the data collection plans are modified such as to increase or decrease the sampling rate.

A criterion, such as a threshold, may be assigned to one or more of the steps that are specified in the manufacturing execution plan 104. Each criterion has an assigned action that needs to be executed if the criterion is not fulfilled. For example, the data that is collected within a certain step in accordance with the applicable data collection plan may not meet a threshold criterion as specified. This triggers performance of a respective action. The action may relate to a maintenance operation for maintenance of the manufacturing tool from which the data that caused the violation of the threshold criterion was collected.

Additional service consumers and/or service providers may be coupled to the message network 108, such as a statistics component 130 that may provide a statistical process control tool, a maintenance component 132 for providing maintenance workflow services, a scheduling component 134, a fab user interface component 136, and/or other service providers and/or service consumers.

The manufacturing execution system 100, the EI 110, the statistics component 130, the maintenance component 132, the scheduling component 134, the fab user interface 136 and/or other components are closely or loosely coupled via the message network 108, such as in a service oriented architecture (SOA).

The default context-specific DCPs and/or the modified context-specific DCPs that are used by the manufacturing execution system 100 can be stored in one or more database tables or in the form of rules or otherwise for dynamic generation of a DCP when it is needed. This can be in the form of predefined objects for improved flexibility and reusability. The same applies to the criteria and their related actions that may also be stored in the form of database tables, rules or otherwise. In particular, a relational database may be used for storage and/or generation of DCPs, criteria and/or actions.

In operation one of the manufacturing tools of the shop floor 112, such as manufacturing tool 122 generates a request 138 for preparation of a manufacturing step. The request 138 may contain an identifier of a material that is being processed by the manufacturing tool 122, such as a lot ID in case of semiconductor manufacturing. In addition the request 138 may indicate a tool identifier of the manufacturing tool 122.

The request 138 is transmitted via the fieldbus 118 to the equipment interface 110 where it is received by interface 116. The equipment interface 110 transforms the request 138 into a request 140 for transmission to the MES 100 via the message network 108. The request 140 may contain an XML document indicating the material ID, such as the lot ID, and/or the manufacturing tool ID.

The request 140 may have the form of a method call, a remote function call or a similar form. In particular, the request 140 can be a hypertext transfer protocol request.

The request 140 is sent from the interface 114 of the equipment interface 110 to the MES 100 via the message network 108. The MES 100 uses the manufacturing execution plan 104 as a planning component for the next sequential manufacturing step.

For example, the MES 100 may use the manufacturing execution plan 104 in order to create a so called factory job for processing the given material or lot as indicated in the request 140. For example, a factory job is generated for processing of a product order for manufacturing of the respective products by instantiation of the manufacturing plan 140. The MES 100 determines the DCP to be used for collecting data in the following manufacturing step to be performed by the manufacturing tool 122 on the material as indicated in the request 140 by means of the manufacturing execution plan 104 and/or the factory job derived from the manufacturing execution plan 104.

Depending on the result of an analysis that has been executed previously by the analytical processing component 128 the result of the determination can be a default DCP or a modified DCP.

Without restriction of generality it is assumed here that the default DCP is applicable. As a consequence the default DCP is returned from the MES 100 to the interface 114 of the equipment interface 110 as response 142.

The response 142 may contain an XML document that carries the DCP as determined by the MES 100. The equipment interface 110 transforms the response 142 into a transformed response 144 and transmits the transformed response 144 from its interface 116 to the requester, i.e., the manufacturing tool 122, via the fieldbus 118.

The manufacturing tool 122 performs the following manufacturing step in accordance with the applicable factory job using the DCP as received with the response 144. The data that is thus acquired by the manufacturing tool 122 is transmitted from the manufacturing tool 122 via the fieldbus 118 to the equipment interface 110 from where it is forwarded via the message network 108 to the MES 100.

The acquired data is stored in the database 126 and analyzed by the analytical processing system 128. Depending on the result of the analysis, the analytical processing system 128 may determine that a modified DCP is to be applied for a consecutive manufacturing step having the same context as the manufacturing step for which the data was acquired. A corresponding flag may be stored in the manufacturing execution plan 104 and/or in the respective factory jobs.

The acquired data which the MES 100 received from the manufacturing tool 122 is also compared against the respective threshold specified in the manufacturing execution plan 104 and/or the respective factory job. If the threshold criterion is not met by the actual data, execution of the respective action is triggered.

For example, the fact that the threshold is exceeded may imply that the manufacturing tool 122 requires immediate maintenance. If this is the case, a respective request 146 is generated by the MES 100 and sent to the maintenance component 132 via the message network 108. In response the maintenance component 132 initiates maintenance of the manufacturing tool 122 as indicated in the request 146.

The embodiment considered here is particularly advantageous as the context of a given manufacturing step as indicated in the request 138 is used for determining the applicable DCP. A default DCP or a modified DCP is selected for performing the data collection during that manufacturing step depending on the data that has been collected during the execution of a previous manufacturing step within the same context.

For example, if the data collected during a previous execution of a manufacturing step with the same context indicates that the process step is performed well within the limits as specified by the manufacturing execution plan 104, the default DCP is selected for the current manufacturing step having that same context. However, if the data that has been collected during execution of the previous manufacturing step with that context has shown a tendency that the process is going out of specification, the modified DCP is selected for performing the current manufacturing step within that context.

The modification may consist in an adaptation of a sampling frequency. For example, if the analytical processing system 128 determines, that the manufacturing process has the tendency to go out of specification, the sampling frequency is increased. The data that are thus acquired with a higher sampling frequency form the basis for controlling the manufacturing process such that it remains within the limits set by the manufacturing execution plan 104.

Likewise, if the acquired data indicates that the process is well within the limits and has no tendency to go out of the limits set by the manufacturing specification, the DCP may also be modified by decreasing the sampling rate.

As regards semiconductor manufacturing, sampling may refer to the definition of the number of times a particular parameter needs to be collected. In the case of lot data collection, this includes the definition of how many components, such as wafers, need to be measured and how many sites in each component need to be measured. The number of components multiplied by the number of sites provides the total nominal number of data points to be collected in one measurement for the given parameter. The determination of dynamics of sampling during the run time based on the flexibility determined by the process engineer on the shop floor thus allows to adapt the sampling rate correspondingly. This includes setting options for advanced sampling and provides the flexibility for using combinatorial sampling options as provided by the manufacturing tools.

Figure 2:
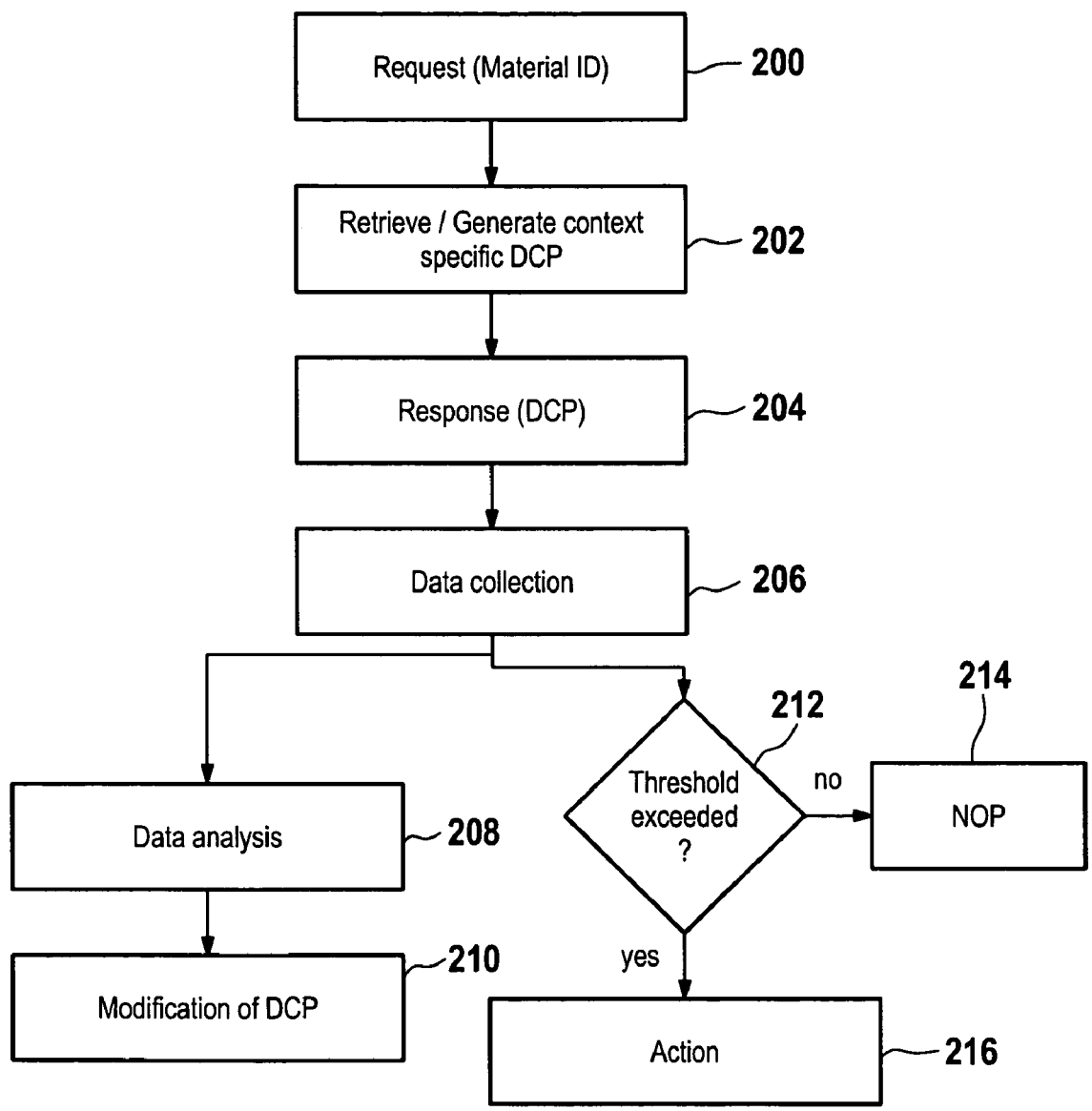
FIG. 2 is a flow chart illustrating an embodiment of a method of the invention.

FIG. 2 shows a respective flowchart. In step 200 one of the manufacturing tools sends a request for preparation of a consecutive manufacturing step. At least a material identifier (ID) identifying the material, part or lot to be processed in the consecutive step is indicated in the request (cf. request 138 in FIG. 1). If necessary, the request is transformed into a different format for transmitting the request from the shop floor to the MES such as by means of an equipment interface (cf. equipment interface 110 of FIG. 1).

In response to receipt of the request by the MES, a context-specific DCP is determined using the manufacturing execution plan, factory job and/or a set of rules. The DCP may be retrieved from a relational database or it may be generated using the set of rules.

The resultant DCP is communicated back from the MES to the requester, i.e., the manufacturing tool, as a response. The response may have the form of an XML document.

In response to receipt of the DCP the manufacturing took performs the data collection in step 206 during execution of the manufacturing step. The acquired data is reported back to the MES for storage and analysis.

The acquired data is analyzed in step 208 such as for determining whether the process is within specification, out of specification or has a tendency to go out of specification. Depending on a result of the analysis performed in step 208 the DCP is modified in step 210, such as by increasing or decreasing the sampling rate. The modified DCP is used when the method of FIG. 2 is executed for a following manufacturing step having the same context as the manufacturing step which resulted in the modification of the DCP.

In step 212 a rule is applied in order to determine whether an exception has occurred. An exception may be defined as a missing data point or the violation of a threshold criterion. If a determination is made in step 212 that no such violation exists, the control goes to step 214 where no operation is performed. Alternatively the control goes to step 216 where a predefined action is performed such as the repetition of a sampling operation in case of a missing data point and/or a maintenance action (cf. request 146 of FIG. 1).

Figure 3:
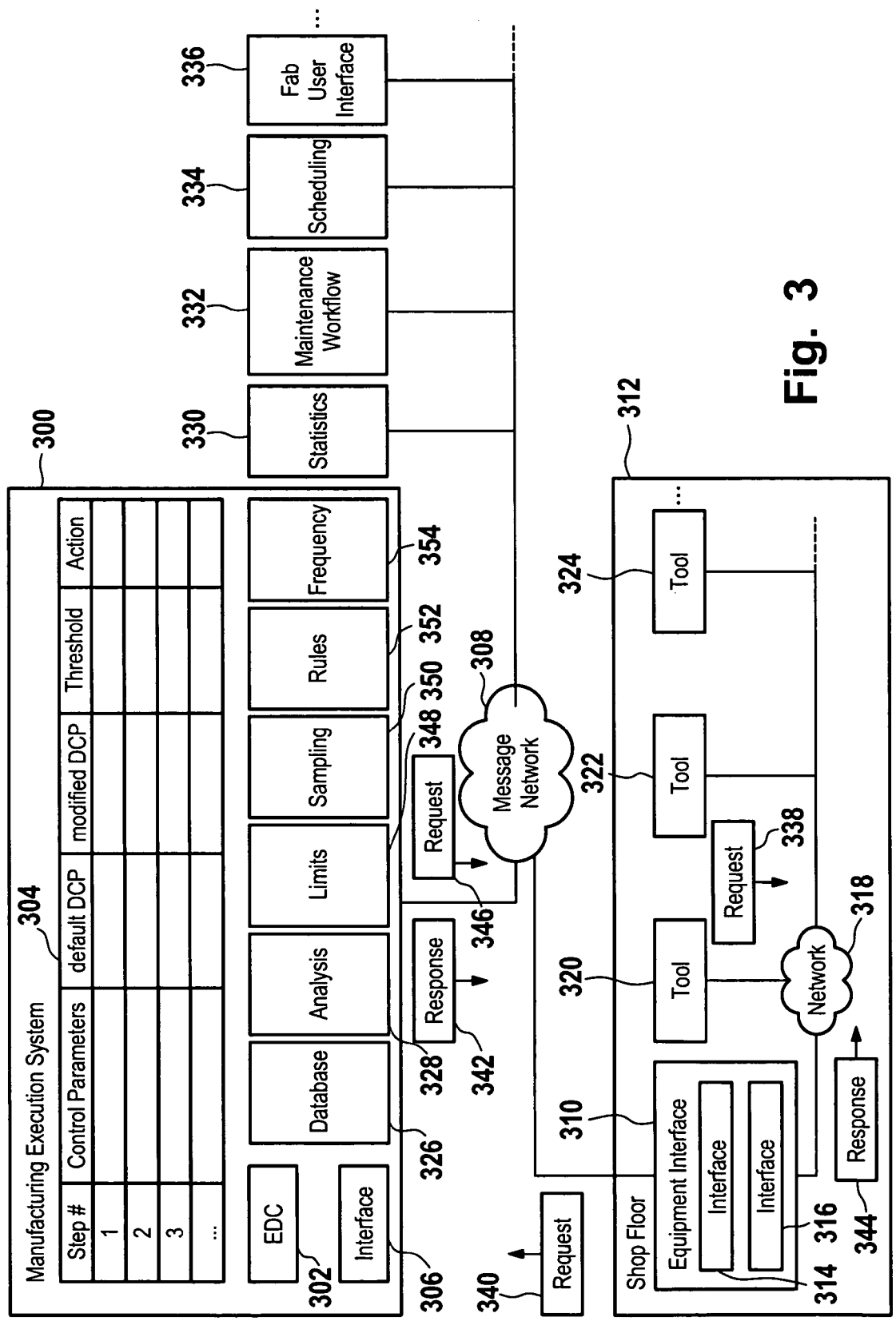
FIG. 3 is a block diagram of a further embodiment of a manufacturing execution system and an equipment interface.

FIG. 3 shows an alternative embodiment of a manufacturing execution system (MES) 300. The MES 300 comprises one or more database tables 348 that hold parameters for defining limits of the data collection. This may include limits given by a product specification or validation limits. The MES 300 has one or more database tables 350 that contain parameters for defining the sampling to be executed for the data collection. This may include definitions as regards the amount of data to be collected and/or the measurement components to be used for the sampling.

The MES 300 has one or more database tables 352 holding parameters for defining rules, such as rules for exception handling, if an out of specification condition or missing data condition occurs. Furthermore, the MES 300 may comprise one or more database tables 354 for defining the frequency of the data collection.

In the embodiment considered here the parameters are stored in the various database tables 348 to 354 in the form of separate objects. Each default context-specific data collection plan is thus specified in the manufacturing execution plan 304 by a set of such objects. As a consequence, each modified context-specific data collection plan can be defined by specifying a replacement and/or modification of an object contained in the specification of the respective default context-specific data collection plan. For example, the modification may be given by selecting one of the objects of one of the database tables 348 to 354 to serve as a replacement for an object given in the default context-specific data collection plan. This is particularly advantageous regarding re-use of the objects for various data collection plans and for dynamic adaptation of the data collection plans by replacing and/or modifying objects. In the embodiments considered here the communication network 318 that couples the manufacturing tools 320, 322, 324, . . . to the equipment interface (EI) 310 is implemented as a high-speed message services network, such as a network in accordance with an E37 standard.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

LIST OF REFERENCE NUMERALS

100 Manufacturing execution system (MES)
102 Engineering data collection (EDC) system
104 Manufacturing execution plan
106 Interface
108 Message network
110 Equipment interface (EI)
112 Shop floor
114 Interface
116 Interface
118 Fieldbus
120 Manufacturing tool
122 Manufacturing tool
124 Manufacturing tool
126 Database
128 Analytical processing system
130 Statistics component
132 Maintenance component
134 Scheduling component
136 Fab user interface
138 Request
140 Request
142 Response 144 Response
146 Request
300 Manufacturing execution system (MES)
302 Engineering data collection (EDC) system
304 Manufacturing execution plan
306 Interface
308 Message network
310 Equipment interface (EI)
312 Shop floor
314 Interface
316 Interface
318 High Speed Messaging Network
320 Manufacturing tool
322 Manufacturing tool
324 Manufacturing tool
326 Database
328 Analytical processing system
330 Statistics component
332 Maintenance component
334 Scheduling component
336 Fab user interface
338 Request
340 Request
342 Response
344 Response
346 Request
348 Database table
350 Database table
352 Database table
354 Database table

The invention claimed is:

1. A manufacturing execution system comprising:
a manufacturing execution plan indicative of manufacturing steps to be executed for manufacturing a product,
a planning component for determining a context-specific data collection plan for data to be collected during execution of at least one of the manufacturing steps,
a service interface for providing the data collection plan in response to a service request,
a database for storing data that has been collected in accordance with a context-specific data collection plan; and
an analytical component for analytically processing the data stored in the database, the planning component being operable to determine a modified context-specific data collection plan depending on a result of the analytical processing,
wherein the modified context-specific data collection plan is provided in response to a subsequent service request relating to the same context as a previous service request that resulted in the modification of the context-specific data collection plan.

2. The manufacturing execution system of claim 1, the context-specific data collection plan being specified by a set of objects.

3. The manufacturing execution system of claim 1, the context-specific data collection plan being a predefined default data collection plan.

4. The manufacturing execution system of claim 1, the modified context-specific data collection plan being provided by replacing or modifying at least one of the objects of the set of objects.

5. The manufacturing execution system of claim 1, further comprising a storage component for storing a predefined criterion and an action related to the criterion, wherein the action is triggered if the predefined criterion is not met by the data.

6. The manufacturing execution system of claim 5, the action being a maintenance action for a manufacturing tool used for the manufacturing of the product.

7. The manufacturing execution system of claim 6, the service interface being adapted to send a maintenance request indicative of the action to a maintenance workflow manager.

8. The manufacturing execution system of claim 1, the service interface being adapted to be coupled to a communication network.

9. A method of operating a manufacturing execution system, the manufacturing execution system comprising a manufacturing execution plan indicative of manufacturing steps to be executed by manufacturing tools for manufacturing a product, the method comprising:
receiving a request for a context-specific data collection plan from at least one of the manufacturing tools;
determining the context-specific data collection plan for data to be collected during execution of one of the manufacturing steps depending on the context of the one of the manufacturing steps;
sending the context-specific data collection plan to the at least one of the manufacturing tools in response to the request;
acquiring data in accordance with the data collection plan;
processing the acquired data to provide a result; and
determining a modified data collection plan depending on the result,
wherein the modified data collection plan is sent to a requester in response to a subsequent service request relating to the same context.

10. The method of claim 9, wherein the context-specific data collection plan is sent to the at least one of the manufacturing tools via an interface.

11. The method of claim 9, the context-specific data collection plan being a default data collection plan.

12. The method of claim 9, further comprising triggering an action that is assigned to a predefined criterion if the acquired data does not meet the predefined criterion.

13. The method of claim 12, the action being a maintenance action for maintenance of the one of the manufacturing tools.

14. The method of claim 9, wherein the data collection plan is provided as an extended markup language (XML) document.

15. The method of claim 9, wherein the product is selected from a group comprising semiconductor products, automotive products, pharmaceutical products, solar cells, electronic devices, hard discs, consumer electronics products, and integrated electronic circuits.

16. A computer program product comprising computer executable instructions for performing a method in accordance with claim 9.

* * * * *

UNITED STATES PATENT AND TRADEMARK OFFICE
CERTIFICATE OF CORRECTION

PATENT NO. : 7,610,177 B2 Page 1 of 1
APPLICATION NO. : 11/588833
DATED : October 27, 2009
INVENTOR(S) : Jayaraman Subramanian et al.

It is certified that error appears in the above-identified patent and that said Letters Patent is hereby corrected as shown below:

Title Pg, Item (75), Inventors, delete "Wuertemberg" and insert -- Wuerttemberg --, therefor.

In column 10, line 22, in Claim 9, delete "too1s;" and insert -- tools; --, therefor.

Signed and Sealed this

Ninth Day of February, 2010

David J. Kappos
*Director of the United States Patent and Trademark Office*